(12) United States Patent
Melrose et al.

(10) Patent No.: US 6,975,468 B1
(45) Date of Patent: Dec. 13, 2005

(54) METHOD TO ACCURATELY PREDICT HARD ERROR RATES RESULTING FROM ENCROACHMENT

(75) Inventors: Thomas Oran Melrose, Longmont, CO (US); Michael McNeil, Nederland, CO (US)

(73) Assignee: Maxtor Corporation, Longmont, CO (US)

( * ) Notice: Subject to any disclaimer, the term of this patent is extended or adjusted under 35 U.S.C. 154(b) by 311 days.

(21) Appl. No.: 10/079,788

(22) Filed: Feb. 16, 2002

Related U.S. Application Data (60) Provisional application No. 60/269,516, filed on Feb. 16, 2001.

(51) Int. Cl.[7] .................. G11B 27/36; G11B 19/04; G11B 5/596
(52) U.S. Cl. .................. 360/31; 360/77.04; 360/60
(58) Field of Search .................. 360/53, 75, 77.02, 360/77.04, 77.08, 77.11, 63, 31, 60, 25

(56) References Cited

U.S. PATENT DOCUMENTS

| | | | |
|---|---|---|---|
| 5,600,500 A | 2/1997 | Madsen et al. | 350/46 |
| 6,249,393 B1 | 6/2001 | Billings et al. | 360/31 |
| 6,405,277 B1 | 6/2002 | Jen et al. | 711/4 |
| 6,408,406 B1 | 6/2002 | Parris | 714/41 |
| 6,445,521 B1 | 9/2002 | Schaff et al. | 360/31 |
| 6,717,757 B1 * | 4/2004 | Levy et al. | 360/31 |
| 2002/0036853 A1 * | 3/2002 | Quak et al. | 360/31 |

OTHER PUBLICATIONS

U.S. Appl. No. 10/008,263, filed Nov. 7, 2001, McNeil et al.

* cited by examiner

Primary Examiner—Andrew L. Sniezek (57) ABSTRACT

A disk drive utilizes a unique write condition for each of the transducers within the drive. Each write condition is determined based upon the specific properties of the corresponding transducer. The write condition information is preferably stored within a memory within the disk drive. When a write operation is performed, the appropriate write condition for the corresponding transducer is used to determine when to write data to the disk. A write condition will typically include one or more individual write criteria. For example, a write condition can specify a write threshold value to be used during a write operation. A write fault threshold value is selected for each transducer by determining a position error distribution corresponding to that transducer wherein the position error distribution is essentially a function of random noise associated with the disk drive, and by using that distribution to determine allowable off-track threshold value (WFL), will protect the drive from encroachments.

44 Claims, 7 Drawing Sheets

METHOD TO ACCURATELY PREDICT HARD ERROR RATES RESULTING FROM ENCROACHMENT

RELATED APPLICATIONS

Applicant claims the benefit of U.S. Provisional Application No. 60/269,516, entitled "A Method to Accurately Predict Hard Error Rates Resulting From Encroachment", filed on Feb. 16, 2001, which is incorporated herein by reference.

FIELD OF THE INVENTION

The invention relates generally to data storage systems and, more particularly, to disk based data storage systems.

BACKGROUND OF THE INVENTION

A disk drive is a data storage device that stores digital data in substantially concentric tracks on a data storage disk therein. During disk drive operation, the data storage disk is rotated about an axis while a transducer is used to read and/or write data from/to a target track of the disk.

A servo control loop is used to position the transducer above the target track while the data transfer is taking place. The servo control loop uses servo data read from a surface of the data storage disk as position feedback to maintain the transducer in a substantially centered position above the target track that is dictated by the mechanical properties of the drive.

When a transducer moves off-track during a write operation, there is a chance that the transducer might inadvertently write data on or near an adjacent track, thus corrupting the data written on the adjacent track (encroachment). In addition, the data that is written off-track by the transducer may be difficult or impossible to read during a subsequent read operation on the present track due to its off-track position. Thus, an off-track threshold value is typically defined in a disk drive that indicates an off-track transducer position beyond which write operations will be suspended. If the transducer goes beyond this off-track position window during a write operation, the write operation is suspended until the transducer again comes within the specified positional window about the target track.

The off-track threshold has traditionally been determined during disk drive development based upon collected (worst case) off-track capability (OTC) data and estimates of transducer positioning error. A single off-track threshold value was then used for all transducers within all drives in a production run. During disk drive test, if the OTC of the transducers in a particular drive were all within a specified range and the measured position error of the drive was also within a corresponding range, the disk drive would be passed (accepted). It would thus be assumed that the off-track threshold programmed into the drive would be sufficient to prevent adjacent track data corruption and unreadable off-track data. If the OTC of a transducer was not within the specified range, the transducer would not be used in a disk drive. Similarly, if a particular drive displayed greater than a predetermined position error, the drive would not be used (failed). As such, the greater the number of disk drive units that are left unused during the manufacturing process, the greater the overall manufacturing costs.

Another disadvantage of conventional techniques for measuring off-track threshold values is that the risks of hard error (unrecoverable data error) rates are assessed by squeezing both tracks adjacent to a test data track in the presence of Repeatable Run Out (RRO) RRO. The data track is written first and the adjacent tracks to the sides of the data track are then written in the presence of a squeeze amount, and the read error rate (Bit Error Rate) is measured on the data track. The amount of squeeze present on any individual test data track or disk drive during actual writing of the adjacent track is enhanced by the actual Repeatable Run Out (RRO) and Non Repeatable Run Out (NRRO) of the test tracks. The amount of squeeze set in such disk drives is determined by a selected off-track threshold (write fault threshold value or Write Fault Limit (WFL)) and an assumption of worst case NRRO and RRO (i.e., worst case position error signal as root mean square sum of the assumed worst case RRO and NRRO). This is used as a screen to insure that no disk drives are passed that will generate hard errors due to track encroachment.

In the conventional measurement process it is assumed that every disk drive will only encounter the assumed worst case position error signal on the test data track. Therefore, each disk drive is only guaranteed to perform without hard read errors (unrecoverable read errors) when the squeeze amount is combined with the worst case position error signal (PES) effects. The effects of RRO are distributed in a manner dependent on spindle quality and other mechanical issues which are not represented as worst case in all drives. Further, RRO is further distributed across the tracks of a disk in a non-uniform manner. Hence, diagnostics that test disk drives, with less than a worst case track position (e.g., 99.73% of a 3-sigma distribution of tracks) can not accurately predict the disk drive tendency to create hard errors with a fixed amount of squeeze. Conversely if a track is selected that is an extreme outlier in the RRO distribution, the drive is failed for insufficient margin. As such, there are disk drives that pass those diagnostic tests, but fail in the field during customer use due to hard errors that are not recovered, and there are disk drives that fail the diagnostic tests but will not produce errors in the field.

There is, therefore, a need for a method and apparatus for accurately predicting the risk of hard errors in a disk drive due to encroachment effects resulting from vibration, shock, seek settle, and recording head write and read widths). There is need for such method and apparatus to increase yields during the disk drive manufacturing process without compromising disk drive performance.

BRIEF SUMMARY OF THE INVENTION

The present invention solves the above problems. A disk drive utilizes a unique write condition for each of the transducers within the drive. Each write condition is determined based upon the specific properties of the corresponding transducer. The write condition information is preferably stored within a memory within the disk drive. When a write operation is performed, the appropriate write condition for the corresponding transducer is used to determine when to write data to the disk. A write condition will typically include one or more individual write criteria. For example, a write condition can specify a write threshold value to be used during a write operation. An off-track threshold value (write fault threshold value) is selected for each transducer by determining a position error distribution corresponding to that transducer wherein the position error distribution is essentially a function of random noise associated with the disk drive, and by using that distribution to determine the allowable off-track threshold value (WFL), which will protect the drive from encroachments and hard errors.

To generate the off-track threshold value for each transducer corresponding to a data storage disk, in one embodiment, the present invention provides a process by which the RRO on the adjacent squeeze tracks of a test track on the disk are reduced to a minimum value, such that the removal of RRO leaves the PES substantially a function of NRRO. Further the NRRO is measured and characterized as the Sigma of the NRRO. The amount of allowable off-track threshold value (WFL) is selected as a variable and not a constant, such that the hard error rate is guaranteed for the design parameters of encroachment effects including shock, vibration, and seek settles. This is because actual hard error rates for any individual disk drive or track is a function of the actual NRRO, the RRO, and the head widths, and not the worst case assumed for each of said parameters. As such, the present invention provides a method for accurately predicting the risk of hard errors in a disk drive due to encroachment effects resulting from vibration, shock, seek settle, and recording head write and read widths. Further, by selecting the off-track threshold value tailored to each transducer per disk drive, the present invention provides a balance between hard error recovery and performance in each disk drive.

The method of the present invention can also be used for implementing variable track density (TPI) utilizing the drive NRRO and RRO to adjust track spacing. With different head geometries and different amounts of NRRO and adjustable squeeze per head, the track density for a track writer can be adjusted per head (and across radial zones on disk surfaces), whereby the WFL for a proposed TPI is selected. For example, once the WFL has been selected it can then be determined how often the drive will break (violate) the WFL. If the drive will break the WFL too often (causing performance degradation) then the TPI can be adjusted (e.g., decreased) to balance performance.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

Figure 1:
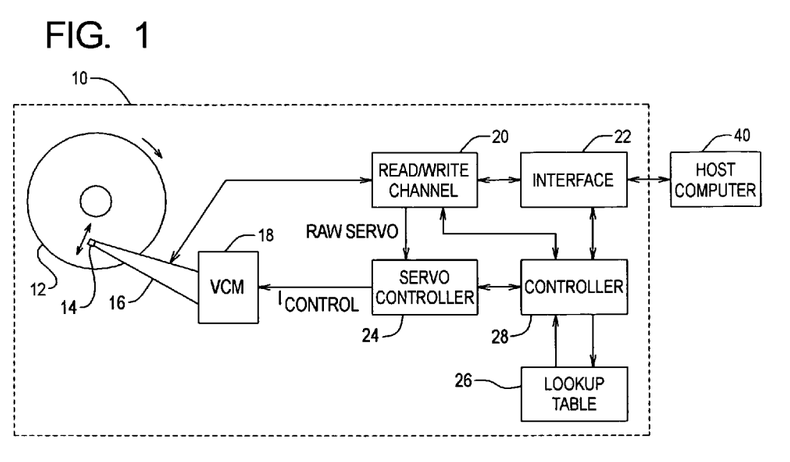
FIG. 1 is a block diagram illustrating a disk drive is accordance with one embodiment of the present invention.

FIG. 1 is block diagram illustrating a disk drive 10 in accordance with one embodiment of the present invention. As illustrated, the disk drive 10 is coupled to an external host computer 40 that uses the disk drive 10 as a mass storage device. It should be appreciated that the blocks illustrated in FIG. 1 are functional in nature and do not necessarily represent discrete hardware elements. For example, in one approach, two or more of the functional blocks within the disk drive 10 are implemented in software in a common digital processor. With reference to FIG. 1, the disk drive 10 includes: at least one data storage disk 12, at least one transducer 14, an actuator arm assembly 16, a voice coil motor (VCM) 18, a read/write channel 20, an interface unit 22, a servo controller 24, a lookup table 26, and disk drive controller 28.

The disk drive 10 receives read and/or write requests from the host computer 40 and carries out the requests by performing data transfers between the at least one disk 12 and the host 40. In a preferred embodiment, the disk drive 10 includes multiple disks 12 in a vertical stack arrangement with one transducer 14 for each operative disk surface. Typically, both surfaces of each disk 12 will be operative for storing user data and, therefore, the disk drive 10 will include two transducers 14 for each disk 12. Single sided disk arrangements can also be used.

The interface unit 22 is operative for providing an interface between the disk drive 10 and the host computer 40. During read and write operations, the interface unit 22 provides a communications path, including data buffering functions, between the host computer 40 and the read/write channel 20. In addition, the interface unit 22 is operative for receiving commands and requests from the host 40 and directing them to the controller 28. The controller 28 then carries out the commands by appropriately controlling the elements within the disk drive 10.

The voice coil motor (VCM) 18 is operative for controllably positioning the transducers 14 with respect to their corresponding disk surfaces in response to a control signal (e.g., Icontrol) generated by the servo controller 24. The transducers 14 are all coupled to a single integrated arm assembly 16 and thus move together under the influence of the VCM 18. When performing a read or write operation, the controller 28 instructs the servo controller 24 to move one of the transducers 14 to a target track on a corresponding disk surface so that a data transfer can take place. The servo controller 24 then generates a control signal to move the identified transducer 14 from a present location to the indicated target track in a process known as a "seek" operation.

Once the transducer 14 has arrived at the target track, the servo controller 24 enters a "track follow" mode during which the transducer 14 is maintained in a substantially centered position above the target track. The bulk of the data transfer between the transducer 14 and the target track occurs during this track follow mode.

The read/write channel 20 is operative for, among other things, performing the data transformations necessary to provide communication between host computer 40 and the disk 12. For example, during a write operation, the read/write channel 20 converts digital data received from the host computer 40 into an analog write current for delivery to one of the transducers 14. During a read operation, the read/write channel 20 provides the data transformations necessary for converting an analog read signal received from one of the transducers 14 into digital representation that can be recognized by the host computer 40. The read/write channel 20 is also operative for separating out servo information read by one transducer and for directing this servo information to the servo controller 24 for use in positioning the transducer.

In the illustrated embodiment, a lookup table 26 is operative for storing an individual off-track threshold value (Write Fault Limit) for each of the transducers 14 in the disk drive 10. The Write Fault Limit (WFL) values are used by the disk drive 10 during write operations to determine when a corresponding transducer is too far off-track to reliably write data to the track. In one example, when performing a write operation, the disk drive controller 28 first retrieves an off-track threshold value from the lookup table 26 corresponding to the transducer 14 associated with the write operation. The controller 28 then allows data to be written to the target track only when the corresponding transducer 14 is within a positional window about the target track that is defined by the retrieved off-track threshold value. The disk drive controller 28 monitors the position of the transducer 14 during the write operation to determine whether it is within the window.

As long as the transducer 14 is positioned within the window, the write operation is allowed to continue. If the transducer 14 moves outside of the window, the controller 28 suspends performance of the write operation until a future time. Typically, the controller 28 will resume writing data on a next pass of the corresponding portion of the target track as long as the transducer 14 is properly positioned at that time. The controller 28 typically controls the writing of data to the target track using a write enable signal delivered to the read/write channel 20.

In one aspect of the present invention, the lookup table 26 stores multiple off-track threshold values for each of the transducers 14 in the disk drive 10. These off-track threshold values are specified as a function of radial position on the corresponding disk surface. In one approach, for example, a separate value is specified for each zone of a corresponding disk surface. Thus, when data is being written to a target track within a particular zone on a disk surface, an off-track threshold value corresponding to that particular zone is retrieved from the lookup table 26 and used during the write operation.

Overview

The actual hard error rate for any individual disk drive or transducer head is a function of the actual NRRO and RRO, and not an assumed worst case value for NRRO and RRO. As such, according to the present invention, the WFL is selected based on the actual RRO and NRRO. Maximizing WFL values, maximizes performance/vibration margin and minimizes hard error recovery margin. Whereas, minimizing that WFL values, minimizes performance/vibration margin and maximizes hard error recovery margin. The present invention provides a method for selecting a WFL for each transducer to maximize performance margin while insuring that there are no encroachment hard errors.

Figure 2A:
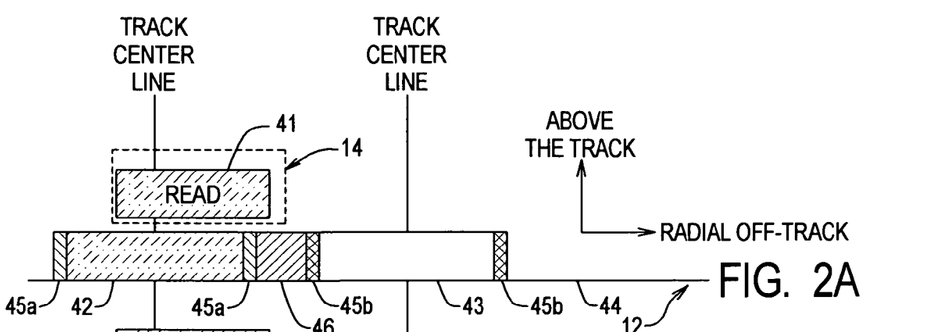
FIGS. 2A–D show diagrammatic examples of adjacent track encroachment on a test track at various squeeze values.
Figure 2B:
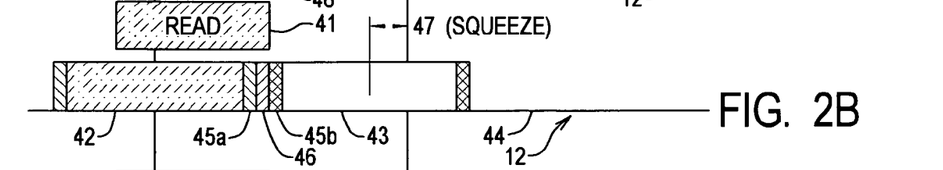
Figure 2C:
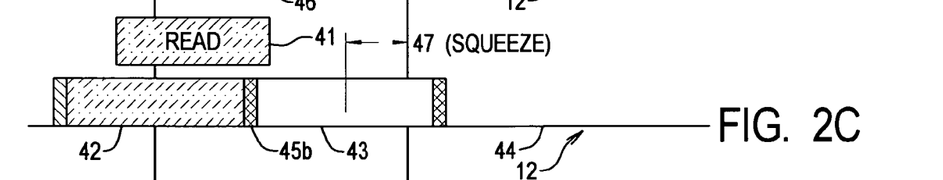
Figure 2D:
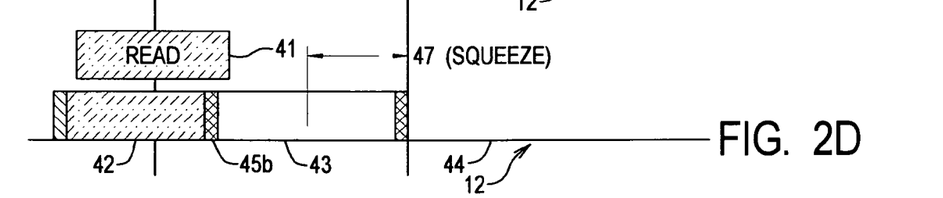
Figure 2E:
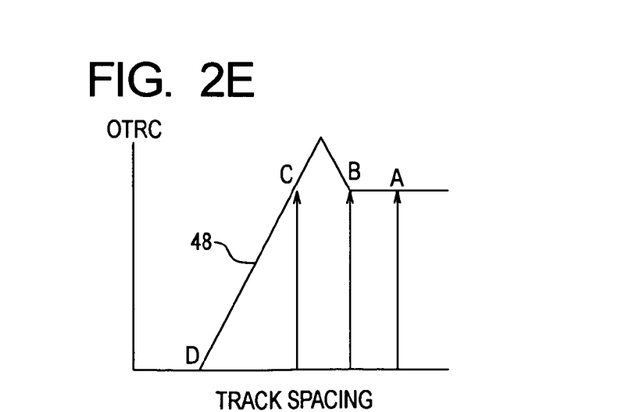
FIG. 2E shows an example representation of magnetization and off track read capability (OTRC) curve for FIGS. 2A–D.

FIGS. 2A–D show example block magnetization models for the disk drive for various squeeze (transducer head off-track) values. A read element (reader) 41 in a transducer head 14 is shown over a track 42, next to an adjacent track 43, on a surface 44 of a disk 12, wherein the disk 12 is in a plane perpendicular to the plane of FIGS. 2A–D. The data track 42 and the adjacent track 43 each are flanked by erase bands 45a and 45b, and separated by a side band 46. The squeeze value 47 sequentially increases from zero in FIG. 2A, to a certain value in FIG. 2D, wherein the adjacent track 43 progressively squeezes into the data track 42. FIG. 2E shows a "747 curve" 48 representation of magnetization and off-track read capability (OTRC) of the head reader 41 in each of FIGS. 2A–D. The amount of squeeze 47 on the data track 42 is directly proportional to the amount of encroachment of the adjacent track 43 on the data track 42.

FIG. 2E shows how far the head reader 41 can move off-track from center line (CL) of the data track 42, and attempt to read data (i.e., off-track capability of the head, for different track spacing with decreasing track spacing from FIG. 2A to FIG. 2D). As long as the adjacent track 43 does not encroach on the data track 42, the head can read data from the data track without hard errors, until the reader 41 encounters the side track 46 noise written first. As the adjacent track 43 encroaches on the data track 42 (squeezing on track spacing), the reader 41 is moved away from the encroachment in order to continue reading from the data track 42 without error. If the adjacent track 43 encroaches on the data track 41 far enough, there is no track position in which the reader 41 can recover data from the data track 42, resulting in a hard read error. As such, a hard error occurs when data on a track 42 is lost because of write operation encroachment from an adjacent track 43.

Conventionally, an off-track threshold value WFL was selected for a set of disk drives. However, different disk drives have different amounts of mechanical vibration and random noise. As such, in some disk drives, the heads 14 over a target track cross over into adjacent tracks more often than other disk drives or heads because of different mechanics. The present invention provides a method to select the WFL per transducer head 14 and per concentric radial zones on a disk surface 44 (each radial zone includes multiple tracks), wherein the WFL is narrow enough to avoid write encroachments that lead to hard errors, but wide enough so that the head 14 does not encounter (break or violate) that limit frequently and suffer performance degradation. Every time the head 14 encounters the WFL the disk 12 must rotate once for the head 14 to write to the same location on the circumference of a target track, thereby degrading disk drive performance.

During disk drive 12 operation, the position of each head 14 relative to a track on a corresponding disk surface 44 is determined periodically when periodic servo information in servo sectors on the track are sampled. Between servo sectors, exact head position is unavailable, and the head can move off-track beyond the WFL due to vibration or shock. The amount of head movement beyond the WFL is termed as Overshoot value, herein. The Overshoot value is typically selected for a set of disk drives, and is measured or estimated based on shock and vibration testing in a set of disk drives.

The Overshoot value can depend on e.g. the acceleration and the velocity of the slew of the head 14 when moving across tracks. For seek operations and for head movement due to vibration, head acceleration is fairly slow, resulting in small Overshoot. But in case of a shock event, the head acceleration is large, and the Overshoot value can be large. As such, an Expected Overshoot value is defined as the worse case Overshoot. While writing a track, if the head 14 moves off-track by more than the amount of WFL+Overshoot, then damaging encroachment on adjacent tracks may occur.

On occasions where, after sampling a servo sector, it is detected that the head 14 has moved off-track beyond the WFL, then the write operation is stopped and the head is moved back on-track by the servo loop 24. It is desirable to set the WFL to the maximum amount such that if the head makes 14 an excursion by the amount of WFL+Overshoot, a write operation using the head on a target track will not produce an encroachment event or hard error on an adjacent track.

In addition to possible Overshoot, there can be head movement relative to the target track due to: (1) non-repeatable (NRRO) or random noise (e.g., off-track movement due to air turbulence, bearings creating vibrations in the drive, etc.), and (2) repeatable run out (RRO) wherein every time the head comes around to the same radial point on the disk the head is off-track by a certain amount on average. The RRO can be caused by noise when the disk servo sectors are initially written by a track writer, such that the servo sectors are laid down incorrectly causing repeatable runout of the servo positions such as perturbations in the tracks.

Because it is repeatable, the effect of RRO on head movement relative to a target track can be accounted for in determining WFL for each head 14 to prevent encroachment on adjacent tracks to the target tack. However, relative head movement due to NRRO must be accounted for differently. As such, the effect of RRO is separated from the NRRO in the head PES by eliminating the RRO. With the RRO eliminated, the head PES indicates the NRRO effect.

A WFL is determined for each head 14 by measuring the encroachment risk of that head 14 as a statistical likelihood of encroachment, as described hereinbelow. A nominal WFL value is selected, an Overshoot value is pre-determined, the NRRO standard deviation (sigma) is measured and the nominal WFL value is adjusted based on the error rate measured during squeezed write operations.

The above process is preferably performed during a disk drive testing procedure that is part of the disk drive manufacturing process. The process can also be used, however, to perform periodic re-calibrations in the field. As such, a program can be included within the disk drive 10, that is capable of performing the process to determine new off-track threshold values WFL after the disk drive 10 has been used for a period of time. The process is preferably performed after head optimization, channel optimization, and servo calibration procedures have been performed for the disk drive 10.

In one implementation of the above process for determining a WFL per head, a track straightening method is used to reduce or eliminate the RRO on three consecutive tracks (e.g., a data track and two adjacent tracks). An Example of such track straightening process (ERC technique) is provided in the copending application Ser. No. 09/753,969 filed Jan. 2, 2001, incorporated herein by reference. The removal of RRO leaves the head PES as essentially a function of NRRO. The NRRO causes head position to vary relative to a track from its idealized center line (CL), such that the track location variation relative to the head is different (random) for each disk rotation. The value of WFL is made a function of the NRRO and head geometry, such that disk drive 10 is guaranteed against hard errors for the design parameters of shock, vibration, and seek settles.

Figure 3:
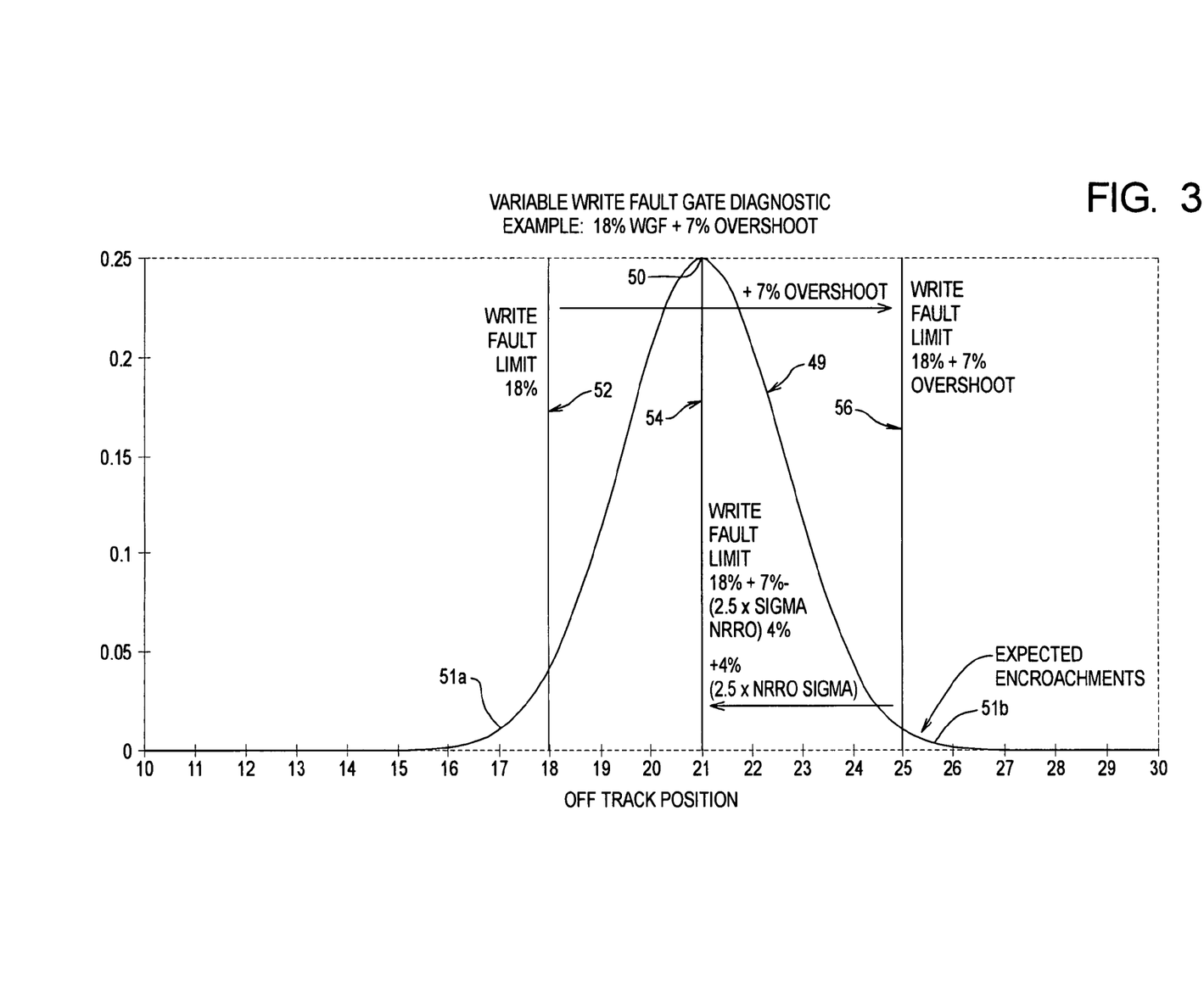
FIG. 3 shows an example NRRO distribution for head off-track position and how it can be used to determine if a WFL is adequate to prevent encroachment events.

The inventors have discovered that the NRRO distribution (track variation from the ideal CL due to NRRO), is a Normal distribution (i.e., bell shaped curve) 49 as shown by example in FIG. 3. In general, when the population from which the data arise have a distribution that is approximately Normal (or Gaussian), then the sigma (standard deviation) of the data provides a useful basis for interpreting the data in terms of probability. The Normal distribution is represented by a family of curves defined uniquely by two parameters, which are the mean and the sigma of the population. The curves are always symmetrically bell shaped about a peak (mean) 50, with "tails" 51a and 51b extending in opposite directions from the peak 50, but the extent to which the curve 49 is compressed or flattened out (tails) depends on the sigma of the population.

As such, the sigma is a useful measure of the scatter of the observations (events) because if the observations follow a Normal distribution, a range covered by one sigma above the mean and one sigma below the mean includes about 68% of the observations; a range of two sigmas above and two sigmas below the mean includes about 95% of the observations; and a range of three sigmas above and three sigmas below the mean includes about 99.7% of the observations. By putting e.g. one, two, or three sigmas above and below the mean, the expected ranges that include about 68%, 95%, and 99.7% of the observations can be estimated. These estimates are for both tails 51a, 51b of the distribution 49 relative to the peak 50, however in one embodiment of the present invention only a single tail 51b is considered as the probability is only one half of these estimates. An on-track NRRO distribution has a mean of zero, wherein if a track is moved (displaced) to squeeze another track in writing data, its mean will equal the amount of displacement.

In FIG. 3, the example NRRO Normal distribution curve 49 indicates the frequency of occurrence of different head positions for a mean off-track position of about 21 percent. FIG. 3 also shows three off-track head positions superimposed on the NRRO distribution curve 49 for the head 14, indicated by: WFL threshold line 52, squeezed center line 54 and (WFL+Overshoot) line 56. If actual (WFL+Overshoot) is at line 56, then damaging encroachment on adjacent tracks is expected to start when writing data with the head 14. The WFL line 52 indicates the location of the WFL, and the squeezed center line 54 marks the off-track position (squeezed center line) of the head 14 for writing data, due to applied squeeze. The head 14 is never positioned at location indicated by the squeezed center line 54 for writing customer data because encroachments on adjacent tracks are expected at that location. The NRRO distribution is centered on the squeezed center 54 where the head 14 is positioned for writing data during the WFL determination process according to the present invention. The further the head 14 moves beyond the (WFL+Overshoot) line 56, the higher the risk of encroachment and hard error in adjacent tracks. The area under the NRRO distribution 49 to the left of the (WFL+overshoot) line 56 corresponds to the expected error rate, if WFL is set to the ideal level.

As such, the present invention allows selecting the highest tolerable WFL per head. In the implementation described herein, a wide WFL is initially selected, write operations are performed, read errors due to head encroachment are determined, and the WFL is reduced as necessary to prevent that encroachment. The frequency of encroachment when the head 14 is centered at the squeezed center line 54, is used to determine if a selected WFL is adequate to protect the drive from encroachments during normal operation. When the head 14 is at squeezed center line 54 threshold, the it is determines if a nominal WFL is too wide or narrow by comparing a read error count against a predetermined read error count at the tail 51b of the NRRO distribution 49. If the error rate is too high relative to a desired level, then the WFL is too wide, and if the error rate is lower than the desired level, then the WFL can be increased without risk of encroachment.

The frequency of the head off-track position at the tails of the NRRO distribution 49 is determined by using the sigma of the NRRO distribution 49. The sigma of the NRRO distribution 49 for the head 14, allows prediction of the frequency that a head 14 exceeds a certain off-track position when writing data on a target track. To determine the amount of encroachment at the squeezed center line 54, a nominal WFL value and Overshoot value are utilized. The NRRO distribution 49 is used to predict how often the head position will exceed WFL+Overshoot, where damaging encroachment on adjacent tracks is expected to begin. From the total number of sectors written, T, and a measurable number of resulting errors, E, a multiple of NRRO sigma corresponding to the E/T ratio can be determined (i.e., from statistical tables), to provide an Expected NRRO. The example in FIG. 3 is for 2.5×sigma as multiple of the NRRO sigma, indicating the head position at off-track location in the tails of the distribution 49, at about 1% of the write operations. Therefore, an encroachment rate of 1% is expected if the WFL is set to the desired level.

To determine the amount of encroachment that will take place at the squeezed center line 54 (e.g., 21% squeeze), a 21% double sided squeeze is applied to the adjacent tracks, and read errors are counted on the center (data) track. Then, the squeeze is adjusted by varying WFL to set the error rate at 1%. In one example, initially, three tracks are selected and straightened using the ERC process, and the squeeze from adjacent tracks on the center track is set to: (nominal WFL+Expected Overshoot−Expected NRRO), indicated by the squeezed center line 54 in FIG. 3, and tracks are written. The center track is then read, and the nominal WFL value is adjusted based on read error rate.

The Expected NRRO above, is a measured value that accounts for relative head movement due to NRRO, and is used to calculate the location of he squeezed center line 54, which represents the squeeze center line for the write operation. Therefore, knowing that the NRRO distribution 49 follows a Normal Distribution, it can be predicted how often the head position exceeds the sum of WFL and Expected Overshoot. As such, a measurable number of errors (encroachments), E, in a population of sector writes, T, can be predicted.

In the example implementation described herein, a method for determining a WFL for each head includes the steps of:

(1) selecting a nominal WFL,
(2) applying an Overshoot value,
(3) selecting a total number of writes, T, to perform (e.g., 50 track writes=31,250 sectors writes),
(4a) selecting the measurable number of errors, E, in the total number of writes T (e.g., E=150 errors or encroachments),
(4b) measuring the NRRO sigma,
(5) as the NRRO distribution is Normal, using statistical tables to determine the Multiple of NRRO Sigma based on the ratio of E/T (e.g., 150/31,250) and define it as the "Expected NRRO",
(6) setting the Squeeze Offset=WFL+Overshoot−Expect NRRO, at line 54 in FIG. 3,
(7) performing the number of writes T with the adjacent tracks squeezing the center track by the Squeeze Offset,
(8) determining the accumulated number of errors, A, for the total number of writes T, and
(9) if the number of read errors, A, is less than the predetermined number of errors E (e.g., 150), then keeping the WFL, otherwise selecting lower WFL value, and repeating steps 6 through 9 until the number of read errors is less than the predetermined number of errors E (e.g., 150).

In the process of selecting WFL per head, the Squeeze Offset is selected to position the head off-track at a location (line 54) where for T writes (e.g., 31,25) there are E expected encroachments (e.g., measurable amount of error, 150). This corresponds to the Expected NRRO of Multiple×Sigma, or about E encroachments in the NRRO distribution's tail 51*b* (e.g., 150 encroachments). If the Squeeze Offset (i.e., WFL+Overshoot−Expected NRRO) produces less than E read errors, then the current WFL selection (line 54 in FIG. 3) is safe for writing customer data. When writing the customer data, the maximum allowable squeeze as measured at a servo sector is only to the extent of the selected WFL (line 52 in FIG. 3). The WFL+Overshoot represents the maximum permissible excursion of the head between servo sectors. The WFL+Overshoot−Expected NRRO (line 54 in FIG. 3) is used to set an extreme case so that a statistically meaningful measurement can be made, as described above.

Example Implementation

Figure 4A:
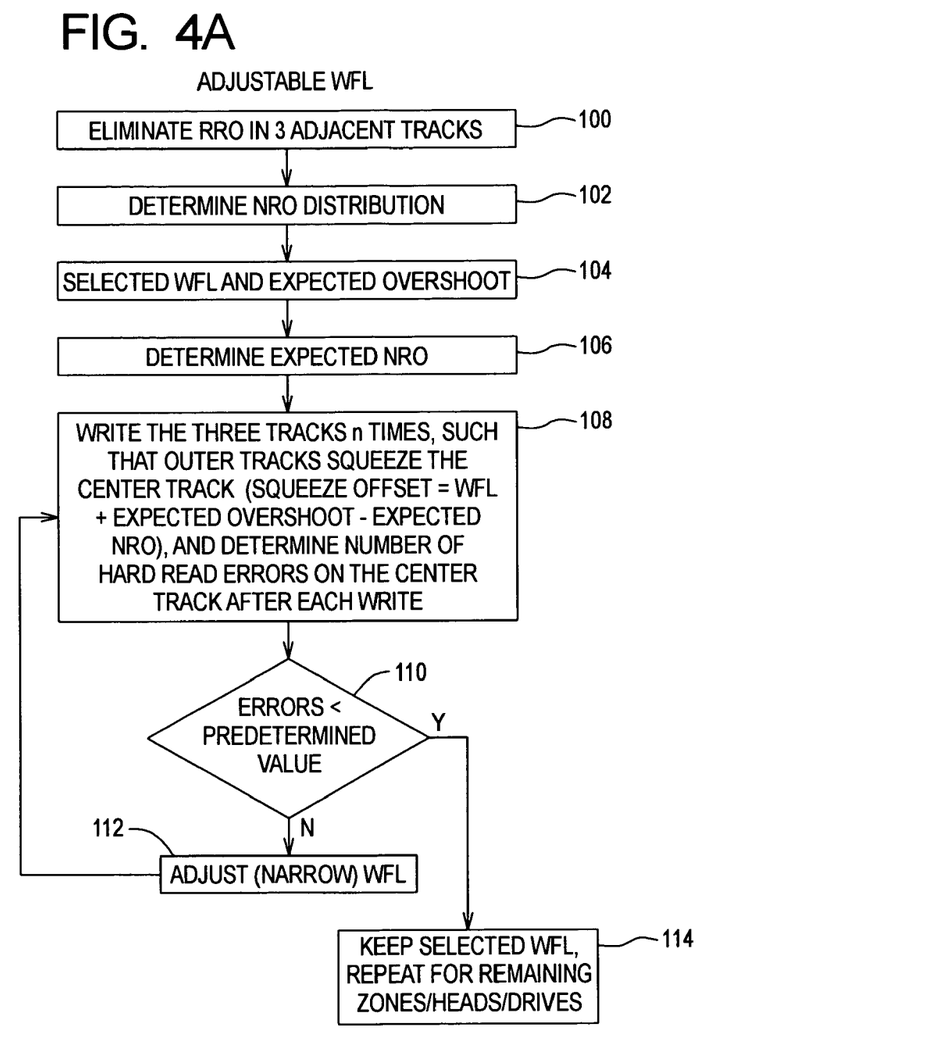
FIG. 4A is a flowchart illustrating a method for generating and storing off-track threshold values during a disk drive manufacturing process in accordance with one embodiment of the present invention.

Referring to FIG. 4A, a flow diagram of steps of an embodiment of the method of determining a WFL for each had 14, according to the present invention, in shown. Three adjacent tracks on a disk surface are selected, and the RRO in those tracks is eliminated using track straightening techniques (step 100). With the RRO eliminated, the head PES is essentially an indication of the NRRO of the tracks relative to the head 14, whereby the PES is used to measure the NRRO distribution for the head 14 before introduction of squeeze (step 102). A nominal WFL and Expected Overshoot value are selected (step 104). The Expected NRRO for the head is determined using the NRRO distribution (step 106). The three tracks are then written n times (e.g., 50 times), such that the outer tracks squeeze the center track by a Squeeze Offset, wherein:

Squeeze Offset=WFL+Expected Overshoot−Expected NRRO;

the center track is read after each write, and any read errors from the center track are counted and accumulated (step 108).

If the number of counted errors are less than a predetermined value based on the head's NRRO distribution 49 (step 110), the selected WFL for the head 14 is accepted (step 114), otherwise, the WFL is adjusted (step 112) and the process repeated for the head 14. Alternately only the adjacent (side) tracks need to be rewritten on each repeating iteration until an error is detected in the center track, wherein the center track is rewritten (the center track remains intact until it is encroached upon and need not be rewritten until then, whereas the adjacent tracks need to be rewritten between each read operation as they are the source of the statistically injected squeeze). The above steps are repeated for each head 14 (optionally per zone) per drive 10, such that a WFL for each head is determined.

In one example, the disk 12 outer diameter (OD) track 500 is selected, and he RRO of that track 500 and adjacent two tracks are eliminated as best as possible (e.g., in 25 or more disk revolutions of ERC correction). Then the sigma of the NRRO of the drive is measured using tracks around track 500, and Expected NRRO determined. Then, the Squeeze Offset is determined as WFL+Overshoot−Expected NRRO, and WFL adjusted per head based on drive mechanics (i.e., NRRO due to drive mechanics).

Figure 4B:
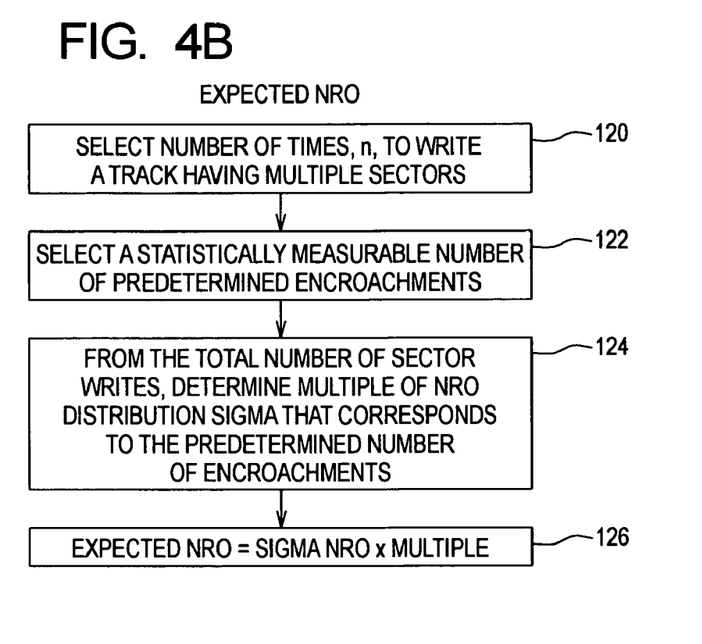
FIGS. 4B–C are detailed portions of flowchart of FIG. 4A for determining off-track threshold values for a disk drive in accordance with one embodiment of the present invention.

FIG. 4B shows steps of an example determination of Expected NRRO above. The Sigma of the NRRO of each head 14 is used to predict how often the NRRO exceeds a specific value. Given the number of sectors, S, on a track and number of times the track is written, N, the total number of sectors written is determined as T=N×S (e.g., 625 sectors per track that is written 50 times, totals T=31,250 sectors written). As such, the process includes the steps of: selecting a total number, T, of writes (e.g., T=31,250 sectors writes) (step 120); selecting a measurable number of encroachments or errors, E, (e.g., 150), in the total number of writes T (step 122); and based on the NRRO distribution, using statistical tables determining the Multiple of sigma based on the ratio of E/T (e.g., 150 errors in 31,250 write events) (step 124) as the Expected NRRO (step 126). As such, Expected NRRO=Multiple×NRRO sigma. In the example of FIG. 3, Expected NRRO=2.5×NRRO sigma.

Figure 4C:
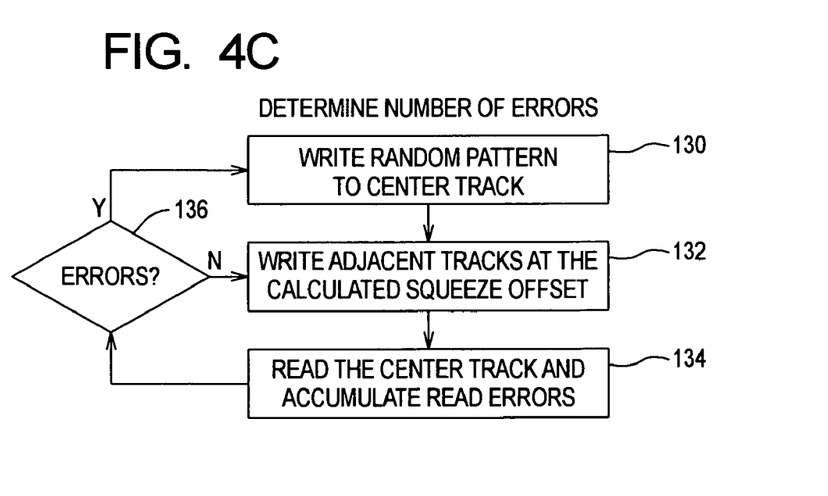

FIG. 4C shows steps of an example error count in writing the center track. The center is written with random patterns (step 130), and the adjacent tracks are then written at the Squeeze Offset determined above (step 132). The center track is then read and number of errors are determined (e.g., using hardware ECCS) (step 134). If no read errors are detected (step 135), then only the adjacent tracks are written again in step 132, otherwise, the number of read errors is added to a running total and the center track is rewritten, and then the adjacent tracks are written at the Squeeze Offset in steps 130 and 132. The above steps are repeated n times (e.g., 50 times), and the read errors from the center track are accumulated.

The center track is rewritten in case of error induced by the squeeze that is generated by the natural NRRO of the drive. A nominal squeeze is initially introduced, but the drive NRRO causes encroachment on the center track, resulting in hard read errors. As such, for every iteration the center track is refreshed in case of read errors induced by the squeeze that is generated by the natural NRRO of the drive. The amount of squeeze present as each sector is being written is sum of the track center position and the instantaneous NRRO. Any encroachments on the center track are permanent, resulting in read errors from the center track and can only be removed be rewriting the center track.

In existing drives, once the WFL is set, if a drive generates unrecoverable read errors (i.e., hard errors), then the drive is failed. According to the present invention, however, that drive is "salvaged" by adjusting WFL based on the NRRO of the drive so the drive 10 does not generate hard errors, and passes diagnostic the test. The predetermined number of errors, E, is selected to have large enough value to be measurable with confidence. A small number may lead to a mistaken reading. The ratio R=E/T (i.e., 150/31,250) is the percentage of head position in the NRRO tail, and existing statistics tables can be used to determine the sigma Multiple (e.g., 3 sigma is 99.7%, wherein R=0.17% corresponds to approximately 3 sigmas).

The predetermined error number, E, is not an indication that the disk drive 10 will generate such number of errors. Rather, the value E is a limit where the disk drive 10 repeatedly makes that number of errors, and then the Squeeze Offset is adjusted to the number of errors. In this example, given a WFL, Expected NRRO value, and Expected Overshoot for a head 14, then T=31,250 writes are performed. If there are more than 150 read errors, then the WFL is not acceptable, and is narrowed to reduce squeeze and the resulting read errors. This guarantees that WFL is low enough to prevent encroachment events on adjacent tracks (read errors) in the field.

The predetermined number of error events, E, in a total of T write events, is used to ensure that there are no hard errors. This is because, for the above write events, the track write center is outside the WFL by the value (Expected Overshoot−Expected NRRO) (e.g., Squeeze Offset=18%+7%−4%=21% off-track). As such, with the squeeze in place, there are E encroachment events expected in T write events. The predetermined number of errors, E, indicates a squeeze amount where the drive repeatedly generates E errors in T writes due to NRRO. For example, if the predetermined number of errors E is selected such that R=E/T=0.01%, then the number of read errors, A, may not be measurable statistically with confidence whereas a larger number E providing R=0.17%, is measurable with confidence. The allowable squeeze (WFL) for writing customer data is adjusted to the mechanics of each drive. The selected WFL per head is related to the amount of NRRO corresponding to each individual head's geometry, which assures reliability, while proving maximum performance. The WFL is maximized just short of creating hard errors; the larger the WFL, the less often a write is delayed, and performance increases.

Alternately an estimate of the squeeze offset (i.e., WFL+Expected Overshoot−Expected NRRO) can be obtained, the error rate measured, the squeeze offset adjusted such that error rate matches the expected (target) error rate, and then knowing the Expected Overshoot and Expected NRRO, the optimal (ideal) WFL calculated.

Performance

After selecting a WFL for a head as described above, it is then determined if the selected WFL causes disk drive performance problems. This is because, a narrow WFL allows wider head widths, however, if the WFL is set too low, the WFL is encountered frequently while writing (due to shock, seek, etc.) and disk revolutions are spent in re-writing for hard error recovery. When writing each customer data sector, if the off-track position of the head violates the WFL limit, the writing stops until a disk revolution brings the target sector back under the correct position of the head, to attempt the write again. The delay in writing degrades the performance of the disk drive. A wide WFL increases disk drive performance, but can allow hard errors due to encroachment. The present invention provides a method of selecting WFL to protect from encroachment induced errors and a way of determining if the performance is degraded from excessive WFL encounters (breaks).

Using the sigma of the head PES, the number of times the head position violated the WFL can be predicted. The PES signal corresponds to normal NRRO and RRO generated in the disk drive 10, without external vibration. Therefore, a Vibration term is used to margin for external vibration during customer use of the disk drive 10. In one example, the RRO and NRRO measurements are made in a static setting, then vibration is introduced to account for external events. A performance balancing method, described below, is used to balance writing in the presence of RRO, NRRO and vibration without hard errors, while providing best performance for each individual disk drive 10.

Figure 5:
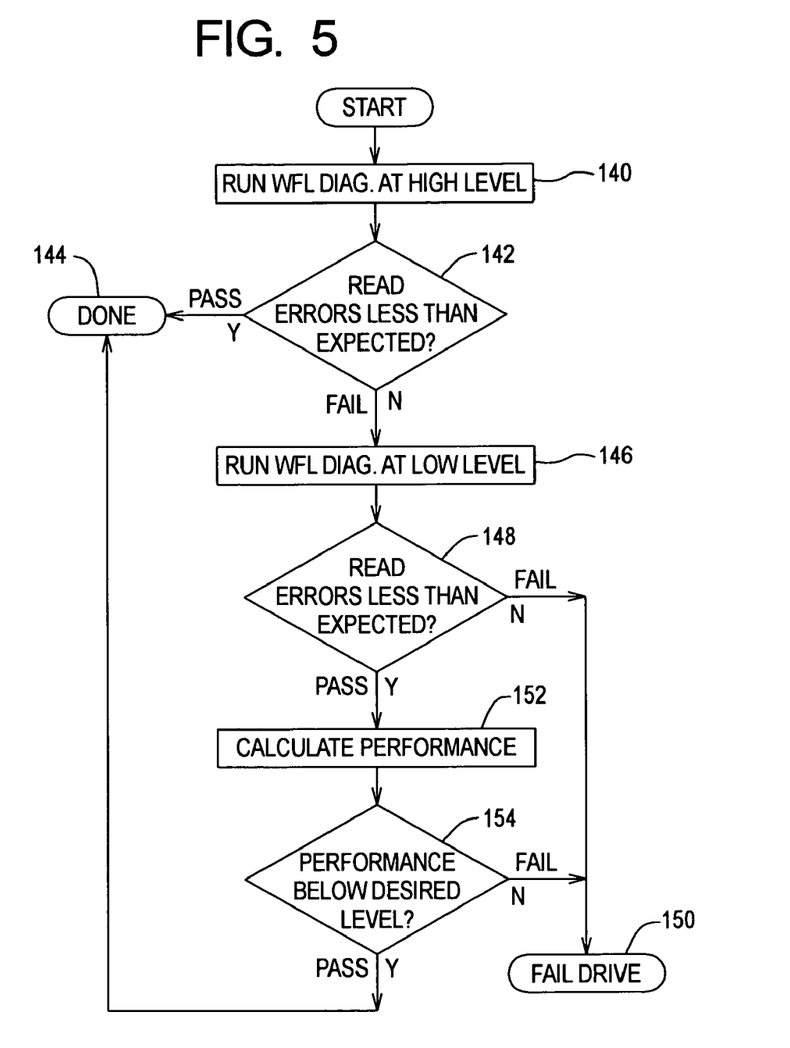
FIG. 5 is a flowchart illustrating a method for balancing performance vs. error recovery during a disk drive manufacturing process in accordance with another embodiment of the present invention.

FIG. 5 shows an example flow diagram of an embodiment of the method of present invention for balancing performance vs. hard error recover in each disk drive 10, per head 14 and optionally per zone. For hard error recovery, initially a nominal (default) wide WFL setting per head 14 is used, and diagnostic tests (described above) are performed to determine error recovery based on that WFL (e.g., number of read errors A are compared to the predetermined number of read errors E) (step 140). If the number of read errors A is less than the predetermined of errors E (step 142), the drive 10 is passed (step 144). If the drive 10 passed, then the nominal WFL is safe (hard error recovery) for wiring customer data, without performance penalties because the nominal WFL was selected wide. However, if the number of read errors A is not less than the predetermined errors E, the drive is failed, and the WFL diagnostic test is repeated at a narrower (lower) WFL (step 146). In one example, there can be two available WFL levels, such as 12% off-track and 16% off-track, wherein WFL=16% is nominally selected as a wide setting, and WFL=12% is selected as a narrow (lower) setting, wherein the allowable maximum squeeze is reduced by 4%. The narrower WFL may eliminate risk of hard errors, but it can cause performance degradation as described above. If the drive 10 does not pass the hard error test with the narrower WFL (step 148), in one example, the drive 10 is failed (step 150), while in another example, narrower WFL values can be utilized to pass the drive 10.

If the drive 10 passes at a narrower WFL, the drive performance is determined (step 152) and a determination is made if the drive 10 has poor performance relative to a desired performance level (i.e., narrower WFL allows less off-track travel of the head, so the head is likely violating the WFL more often causing rewrite attempts) (step 154). In this example, if the drive has acceptable performance it is passed, otherwise it is failed. One WFL break per surface is an extreme performance requirement (in current technology there are e.g. 60,000 tracks per surface; one WFL break per surface is for only 0.0016% of all tracks). Typically a performance degradation of 1 percent is not noticeable, which would correspond to one WFL break per 100 tracks written.

The drive performance can be estimated based on the PES sigma per head 14, providing a pass/fail test for the performance level of each disk drive 10. Statistical basis of PES for a minimum WFL utilizes a statistical measurement of the PES for each head 14. By determining the Sigma of the PES for a head 14, the frequency that the head exceeds the WFL in a static setting can be predicted. Then, the WFL can be set to e.g. 5×(PES sigma)+Arrival Settling+Taper. This yields a performance term of about 1 WFL break per surface written (static). A Vibration term can be added to insure vibration margin.

Arrival Settling is a term that describes the amount of overshoot expected when the head 14 arrives on track after a seek. Typically when settling on track a head can go past the track centerline, and when the head 14 is within a specified distance of the track centerline (WFL, or Fine Track Window or FTW) for two or more servo samples, the drive controller 28 allows the drive 10 to start reading and writing. The head 14 may still be slewing at a significant velocity, and it also may go some distance beyond the WFL. This excursion beyond WFL is the Arrival Settling term. The Taper term is used to counter the effect of PES reduction at the inner diameter (ID). If the PES is measured at the OD, location of maximum PES, then more WFL breaks are predicted than will actually be experienced. If PES is measured at the ID (Minimum PES), then the prediction is low.

The heads 14 have a distribution of write widths, read widths and other characteristics, and the spin motors have a distribution of mechanical Runout. When the worst of the heads are paired with the worst of the spin motors, then the drive 10 has no margin and must be rebuilt or reprocessed at a lower capacity (track density). The present invention allows detecting the worst combinations for rework while simultaneously optimizing the performance of the rest of said distributions. Further, the heads can be designed differently, allowing wider reader and writer heads for signal to noise ratio. For any given track spacing, the head writer and reader can be made wider, and in case of a head with a worst case writer the WFL for that heads is adjusted such that the head does not cause hard errors.

An example algorithm for setting maximum WFL per head includes the following steps. Heads are designed to a WFL less than 3 sigma WFL of a population of heads. WFL is set to a 3 sigma design level, and the heads are tested with maximum WFL double sided encroachment (adjacent track squeeze on a center track). Passing heads are verified with the PES based minimum WFL, whereas failing heads are re-tested with a smaller head-design WFL. Passing drives must have (3×PES+Vibration+Settling)<WFL. If (3×PES+Vibration+Settling)>head design WFL, then drive is failed and can be reprocessed as: (1) lower vibration margin drive, (2) Re-STW at lower speed, (3) 100% ERC to reduce the PES, (4) change spin motor or head stack assembly, or (5) Re-STW at a lower TPI.

Conventionally, selecting WFL does not address variability of the NRRO for the different mechanics in hard error recovery tests, and no performance level determination are made. By contrast the present invention quantifies hard error recovery, and drive performance, per disk drive.

Variable Track Density (TPI)

The method of the present invention can also be used for implementing variable track density (e.g., tracks per inch or TPI) utilizing the drive NRRO and RRO to adjust track spacing. The head off-track location where a write operation causes encroachment on adjacent tracks, is a function of track density. With different head geometries and different amounts of NRRO and adjustable squeeze per head, the track density for a track writer can be adjusted per head (and across radial zones on disk surfaces), whereby the WFL for a proposed TPI is selected. Once the WFL for each head 14 has been selected a determination can be made as to how often the drive will break (violate) the WFL values. If a head will break the WFL too often (causing performance degradation) then the TPI can be adjusted (e.g., decreased) to balance performance. Alternately if the head produces less read errors than expected, when tested at (WFL+Expected Overshoot−Expected NRRO), the TPI can be increased and the drive tested again.

This allows a higher track density for a significant percentage of the population of heads and drive mechanics. At high track density it is desired to preserve a wider read width for better signal to noise ratio (SNR), and reduce problems associated with the manufacturability of small head read widths. A variable WFL according to the present invention allows designing the heads to a wider nominal WFL for a wider write width and read width at a given TPI, thereby increasing performance (or allows a higher TPI for a given head design to increase capacity).

Figure 6:
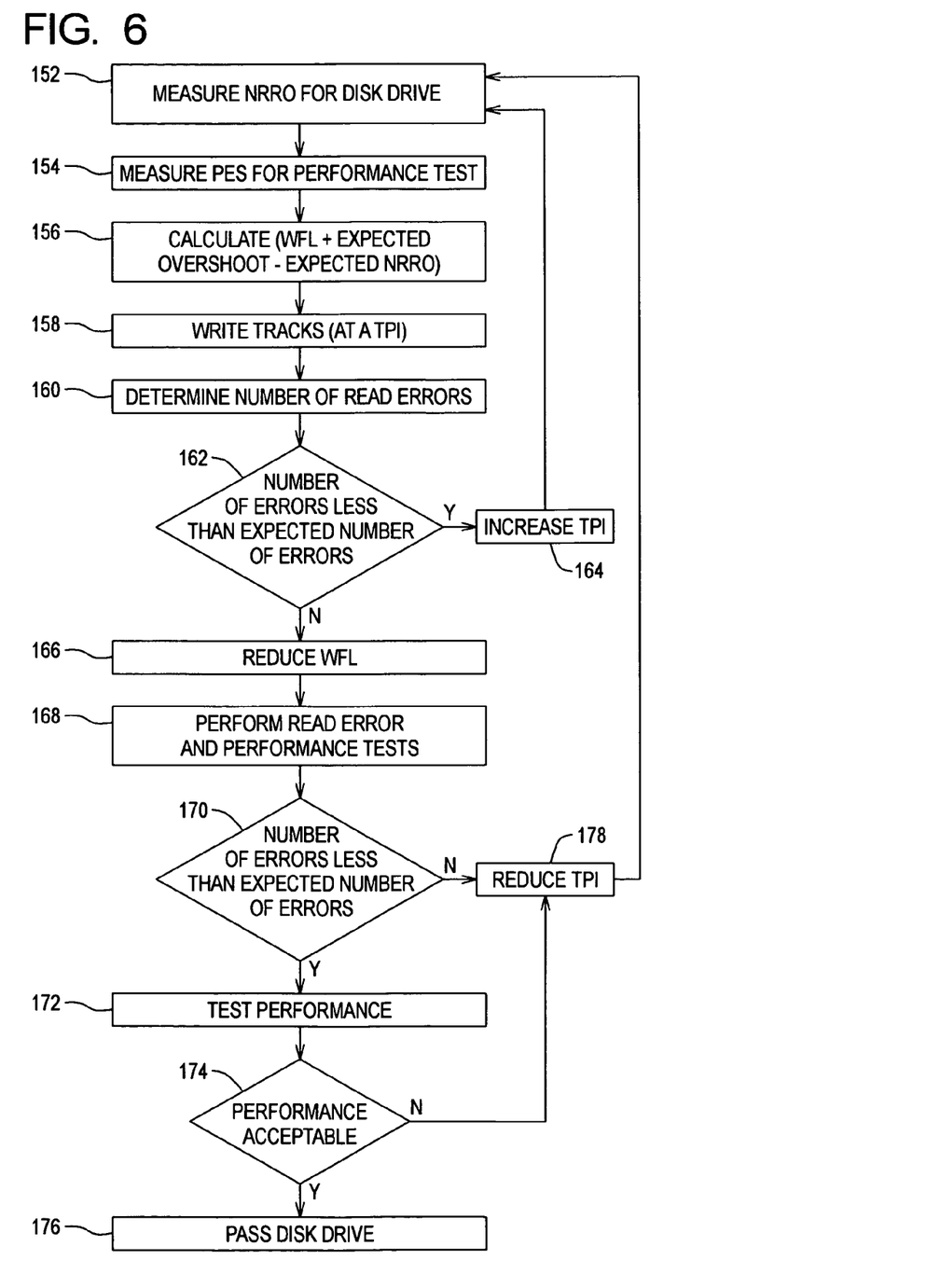
FIG. 6 is a flowchart of an embodiment of the steps of a method of implementing variable track density according to the present invention.

Referring to the example flowchart in FIG. 6, one implementation of variable TPI according to the present invention includes the following steps: disk drive NRRO is measured (step 152), the PES is measured for performance measurements (step 154), the value WFL+Expected Overshoot−Expected NRRO, is calculated (described above) (step 156), tracks are written (at a proposed TPI) (step 158), drive read error tests are performed and number of read errors determine (WFL diagnostics described above) (step 160), if there are less then the expected number of read errors (step 162), then there is excess TPI margin and the TPI is increased (increasing capacity) (step 164), and steps 160–174 are repeated, otherwise, if there are more errors than expected, then the WFL is reduced (narrowed) (step 166), drive read error tests are performed at the reduced WFL (step 168), if the read errors are less than expected (step 170), then the performance of the drive is tested (step 172), if the drive performance is acceptable (step 174), then the drive is passed (step 176), otherwise, if the drive fails the read error tests at the reduced or if the drive fails performance tests, then the TPI is reduced (step 178) and the drive is tested again at reduced TPI by repeating the above steps 152–178.

As such variable TPI according to the present invention allows increasing TPI (capacity). The above steps can be performed increase the TPI on selected single-disk drives.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for use in tuning a disk drive, said disk drive including at least one data storage disk, said at least one data storage disk having a first data storage surface having concentric tracks with periodic servoing information, and a second data storage surface having concentric tracks with periodic servoing information, said disk drive also including a first transducer for writing digital data to said first data storage surface and a second transducer for writing digital data to said second data storage surface, said method comprising the steps of:
   (a) determining a first position error corresponding to the first transducer wherein the first position error is essentially a function of random noise associated with the disk drive;
   (b) generating a first off-track threshold value based on the first position error;
   (c) determining a second position error corresponding to the second transducer wherein the second position error is essentially a function of random noise associated with the disk drive;
   (d) generating a second off-track threshold value based on said second position error; and
   (e) storing said first and second off-track threshold values in a memory within the disk drive for use during subsequent write operations in the disk drive, said first off-track threshold value for use during write operations involving said first transducer and said second off-track threshold value for use during write operations involving said second transducer.

2. The method of claim 1, wherein in step (a) said first position error is determined by:
   obtaining a first position error signal (PES) from the first transducer, wherein the first PES signal comprises a first repeatable (RRO) noise signal and a first non-repeatable (NRRO), random, noise signal; and
   separating the first RRO position signal from the first NRRO position signal such that the first NRRO position signal represents the first position error.

3. The method of claim 1, wherein step (b) further includes the steps of:
   (1) selecting an off-track threshold value, and an overshoot value for maximum allowable transducer movement beyond the off-track threshold value between servo information on the tracks;
   (2) calculating a squeeze offset as a function of: (i) the off-track threshold value, (ii) the overshoot value and (iii) a predicted relative transducer off-track movement due to the random noise, based on the first position error;
   (3) determining an off-track capability of the first transducer at the squeeze offset off-track position; and
   (4) if the off-track capability of the first transducer complies with a specified value, then maintaining the off-track threshold value as the first off-track threshold value, otherwise, adjusting the off-track threshold value and repeating steps (2) through (4) using the adjusted off-track threshold value.

4. The method of claim 3, wherein the step of determining the off-track capability of the first transducer further includes the steps of:
   performing write operations using the first transducer on a data track and at least one adjacent track on the first data storage surface, by writing data on the data track and then writing the adjacent track multiple times with the head positioned off-track towards the data track by the squeeze offset, and accumulating the number of read errors from the data track due to encroachment of the head on the data track in the multiple write operations;
   determining if the number of accumulated read errors is less than a statistically measurable number of errors in said multiple write operations; and
   if so, maintaining the off-track threshold value as the first off-track threshold value, otherwise, adjusting the off-track threshold value and repeating said steps (2) through (5) using the adjusted off-track threshold value.

5. The method of claim 4, wherein the step of calculating the squeeze offset further includes the steps of:
   selecting a statistically measurable error number in said multiple write operations;
   obtaining a multiplier for the standard deviation (sigma) of the first position error distribution, corresponding to said statistically measurable error number in the multiple write operations;
   calculating a product of the multiplier and sigma, accounting for relative transducer off-track movement due to the random noise;
   calculating the squeeze offset according to the relation:

squeeze offset=off-track threshold value+overshoot value−multiplier×sigma.

6. The method of claim 1, wherein step (b) further includes the steps of:
   (1) generating a statistical distribution of the first position error;
   (2) selecting an off-track threshold value and an overshoot value for maximum allowable transducer movement beyond the off-track threshold value between servo information on the storage surface;
   (3) calculating a squeeze offset based on the off-track threshold value and the distribution of the first position error, such that the squeeze offset is a function of the off-track threshold value and relative transducer off-track movement due to the random noise;
   (4) performing write operations using the first transducer on a data track and at least one adjacent track on the first data storage surface, by writing data on the data track and then writing the adjacent track multiple times with the head positioned off-track towards the data track by the squeeze offset, and accumulating the number of read errors from the data track due to encroachment of the head on the data track in the multiple write operations;
   (5) determining if the number of accumulated read errors is less than a statistically measurable error number in said multiple write operations; and
   (6) if so, maintaining the off-track threshold value as the first off-track threshold value, otherwise, adjusting the off-track threshold value and repeating steps (3) through (6) using the adjusted off-track threshold value.

7. The method of claim 6, wherein step (b)(4) further includes the steps of:
performing write operations using the first transducer on a data track and two adjacent tracks on the first data storage surface, by writing data on the data track and then writing the adjacent tracks multiple times with the head positioned off-track towards the data track by the squeeze offset, and accumulating the number of read errors from the data track due to encroachment of the head on the data track in the multiple write operations.

8. The method of claim 1, wherein step (b) further includes the steps of:
(1) generating a statistical distribution of the first position error;
(2) selecting an off-track threshold value;
(3) calculating a squeeze offset based on the off-track threshold value and the distribution of the first position error;
(4) performing multiple write operations using the first transducer on a data track and at least one adjacent track on the first data storage surface, wherein each write operation includes the steps of:
writing the data track;
writing each adjacent track with the first transducer positioned off-track towards the data track by the squeeze offset;
reading the data track and determining the number of read errors;
in case of read errors, accumulating the number of read errors, and rewriting the data track and then each adjacent track with the squeeze offset, otherwise, if no errors, only rewriting each adjacent track with the squeeze offset;
(5) determining if the number of accumulated read errors is less than a statistically measurable error number in said multiple write operations; and
(6) if so, maintaining the off-track threshold value as the first off-track threshold value, otherwise, adjusting the off-track threshold value and repeating steps (3) through (6) using the adjusted off-track threshold value.

9. The method of claim 1, further comprising the step of:
determining a separate off-track threshold value for each of a plurality of disk zones on said first data storage surface and said second data storage surface for said first and second transducers.

10. The method of claim 1, wherein:
said disk drive includes a plurality of transducers, said method further including the step of determining at least one off-track threshold value for each of said plurality of transducers.

11. The method of claim 1, wherein in step (c) said second position error is determined by:
obtaining a second position error signal (PES) from the second transducer, wherein the second PES signal comprises a second repeatable noise signal and a second non-repeatable (NRRO), random, noise signal; and
separating the second RRO position signal from the second NRRO position signal such that the second NRRO position signal represents the second position error.

12. The method of claim 1, wherein step (d) further includes the steps of:
(1) selecting an off-track threshold value, and an overshoot value for maximum allowable transducer movement beyond the off-track threshold value between servo information on the tracks;
(2) calculating a squeeze offset as a function of: (i) the off-track threshold value, (ii) the overshoot value and (iii) a predicted relative transducer off-track movement due to the random noise, based on the second position error;
(3) determining an off-track capability of the second transducer at the squeeze offset off-track position; and
(4) if the off-track capability of the second transducer complies with a specified value, then maintaining the off-track threshold value as the second off-track threshold value, otherwise, adjusting the off-track threshold value and repeating steps (2) through (4) using the adjusted off-track threshold value.

13. The method of claim 12, wherein the step of determining the off-track capability of the second transducer further includes the steps of:
performing write operations using the second transducer on a data track and at least one adjacent track on the second data storage surface, by writing data on the data track and then writing the adjacent track multiple times with the head positioned off-track towards the data track by the squeeze offset, and accumulating the number of read errors from the data track due to encroachment of the head on the data track in the multiple write operations;
determining if the number of accumulated read errors is less than a statistically measurable number of errors in said multiple write operations; and
if so, maintaining the off-track threshold value as the second off-track threshold value, otherwise, adjusting the off-track threshold value and repeating said steps (2) through (5) using the adjusted off-track threshold value.

14. The method of claim 13, wherein the step of calculating the squeeze offset further includes the steps of:
selecting a statistically measurable error number in said multiple write operations;
obtaining a multiplier for the standard deviation (sigma) of the second position error distribution, corresponding to said statistically measurable error number in the multiple write operations;
calculating a product of the multiplier and sigma, accounting for relative transducer off-track movement due to the random noise;
calculating the squeeze offset according to the relation:

squeeze offset=off-track threshold value+overshoot value−multiplier×sigma.

15. The method of claim 1, wherein:
the step of generating the first off-track threshold value further includes the steps of generating the first off-track threshold value based on the first position error and the performance criteria; and
the step of generating the second off-track threshold value further includes the steps of generating the second off-track threshold value based on the second position error and the performance criteria.

16. The method of claim 1, wherein:
the step of generating the first off-track threshold value further includes the steps of generating the first off-track threshold value based on the first position error to prevent hard errors while meeting performance criteria; and
the step of generating the second off-track threshold value further includes the steps of generating the second off-track threshold value based on the second position error to prevent hard read errors while meeting the performance criteria.

17. The method of claim 1, further including the steps of:
(f) determining the performance of the disk drive;
(g) comparing the performance of the disk drive to performance criteria; and
(h) rejecting the disk drive if the disk drive performance is below the performance criteria.

18. A method for use in writing data to a data storage disk in a disk drive, comprising the step of:
(a) receiving a command to write digital data to a first track on a first disk surface within the disk drive;
(b) moving a transducer associated with the first disk surface from a present position to a position above the first track;
(c) retrieving an off-track threshold value corresponding to said transducer from a memory associated with the disk drive, wherein transducer off-track position must comply with said off-track threshold value before data can be written to the first disk surface using said transducer, said memory storing separate off-track threshold value information, comprising a position error based on noise associated with the disk drive, for each of a plurality of transducers within the disk drive; and
(d) writing data to said first track of the first disk using said transducer when said off-track threshold value associated with said transducer is satisfied within the disk drive.

19. The method of claim 18, wherein said off-track threshold value is based on a position error corresponding to that transducer in the disk drive, such that the position error is essentially a function of random noise associated with the disk drive.

20. The method of claim 18, wherein said position error is determined by:
obtaining a position error signal (PES) from the transducer, wherein the PES signal comprises a repeatable noise signal (RRO) and a non-repeatable (NRRO), random, noise signal; and
separating the RRO position signal from the NRRO position signal such that the NRRO position signal represents the position error.

21. The method of claim 18, wherein:
said memory includes, for a first plurality of transducers, separate off-track threshold values for each of a plurality of disk zones.

22. A computer readable medium having program instructions stored thereon for implementing the method of claim 18 when executed in a digital processor.

23. A method for use in a disk drive manufacturing environment, comprising the steps of:
(a) providing a first disk drive;
(b) determining a position error corresponding to a first transducer in the disk drive, wherein the position error is essentially a function of random noise associated with the disk drive;
(c) generating a first off-track threshold value based on the position error; and
(d) storing said first off-track threshold value in a memory within the disk drive for use during subsequent write operations in the disk drive involving said transducer.

24. The method of claim 23, further comprising the steps of:
determining a second position error corresponding to a second transducer in the disk drive, wherein the second position error is essentially a function of random noise associated with the disk drive;
generating a second off-track threshold value based on the second position error; and
storing said second off-track threshold value in the memory within the disk drive for use during subsequent write operations in the disk drive involving said second transducer.

25. The method, as claimed in claim 24, wherein:
said second off-track threshold value is different from said first off-track threshold value.

26. The method of claim 23, further comprising the steps of:
providing a second disk drive that is different from said first disk drive;
determining a second position error corresponding to a transducer in the second disk drive, wherein the second position error is essentially a function of random noise associated with the second disk drive;
generating a second off-track threshold value based on the second position error; and
storing said second off-track threshold value in a memory within the second disk drive for use during subsequent write operations in the second disk drive involving said second transducer.

27. The method of claim 23, wherein:
said disk drive includes a plurality of transducers, said method further including the step of determining at least one off-track threshold value for each of said plurality of transducers.

28. The method of claim 23, wherein in step (b) said position error is determined by:
obtaining a position error signal (PES) from the transducer, wherein the PES signal comprises a repeatable (RRO) noise signal and a non-repeatable (NRRO), random, noise signal; and
separating the RRO position signal from the NRRO position signal such that the NRRO position signal represents the position error.

29. The method of claim 23, wherein step (c) further includes the steps of:
(1) selecting an nominal off-track threshold value, and an overshoot value for maximum allowable transducer movement beyond the nominal off-track threshold value between servo information on the tracks;
(2) calculating a squeeze offset as a function of: (i) the nominal off-track threshold value, (ii) the overshoot value and (iii) a predicted relative transducer off-track movement due to the random noise, based on the position error;
(3) determining an off-track capability of the transducer at the squeeze offset off-track position; and
(4) if the off-track capability of the transducer complies with a specified value, then maintaining the nominal off-track threshold value as the first off-track threshold value, otherwise, adjusting the nominal off-track threshold value and repeating steps (2) through (4) using the adjusted off-track threshold value.

30. A disk drive comprising:
at least one data storage disk having a plurality of substantially concentric tracks for storing digital data, said data storage disk having at least two data storage surfaces;
at least two transducers for use in writing digital data to said two data storage surfaces, said two transducers including a first transducer corresponding to a first data storage surface and a second transducer corresponding to a second data storage surface;

an actuator assembly coupled to said at least two transducers for use in controllably positioning said at least two transducers with respect to data storage disks, said actuator assembly including an actuator arm assembly for supporting two transducers and a voice coil motor for imparting motion to said actuator arm assembly in response to a control signal;

a servo control unit for generating said control signal for use in positioning said two transducers with respect to said data storage disk; and a memory for storing off-track threshold values for each of said two transducers, each off-track threshold value comprising a position error, based on noise associated with the disk drive, corresponding to the corresponding transducer in the disk drive, wherein each transducer relative off-track position must comply with corresponding off-track threshold value before data can be written to a disk using that transducer, said memory including a first off-track threshold value corresponding to said first transducer and a second off-track threshold value corresponding to said second transducer.

31. The disk drive of claim 30, wherein each off-track threshold value is based on a position error corresponding to the corresponding transducer in the disk drive, such that the position error is essentially a function of random noise associated with the disk drive.

32. The disk drive of claim 31, wherein each position error is determined by:
obtaining a position error signal (PES) from the corresponding transducer, wherein the PES signal comprises a repeatable noise signal (RRO) and a non-repeatable (NRRO), random, noise signal; and
separating the RRO position signal from the NRRO position signal such that the NRRO position signal represents the position error.

33. The disk drive of claim 31, wherein each off-track threshold value is selected by:
(1) selecting a nominal off-track threshold value, and an overshoot value for maximum allowable transducer movement beyond the nominal off-track threshold value between servo information on the tracks;
(2) calculating a squeeze offset as a function of: (i) the nominal off-track threshold value, (ii) the overshoot value and (iii) a predicted relative transducer off-track movement due to the random noise, based on the position error;
(3) determining an off-track capability of the corresponding transducer at the squeeze offset off-track position; and
(4) if the off-track capability of that transducer complies with a specified value, then maintaining the off-track threshold value as the off-track threshold value, otherwise, adjusting the nominal off-track threshold value and repeating steps (2) through (4) using the adjusted off-track threshold value.

34. The disk drive of claim 33, wherein the step of determining the off-track capability of each transducer further includes the steps of:
performing write operations using that transducer on a data track and at least one adjacent track on the data storage surface, by writing data on the data track and then writing the adjacent track multiple times with the head positioned off-track towards the data track by the squeeze offset, and accumulating the number of read errors from the data track due to encroachment of the head on the data track in the multiple write operations;
determining if the number of accumulated read errors is less than a statistically measurable number of errors in said multiple write operations; and
if so, maintaining the nominal off-track threshold value as the off-track threshold value, otherwise, adjusting the nominal off-track threshold value and repeating said steps (2) through (5) using the adjusted off-track threshold value.

35. The disk drive of claim 34, wherein the step of calculating the squeeze offset further includes the steps of:
selecting a statistically measurable error number in said multiple write operations;
obtaining a multiplier for the standard deviation (sigma) of the second position error distribution, corresponding to said statistically measurable error number in the multiple write operations;
calculating a product of the multiplier and sigma, accounting for relative transducer off-track movement due to the random noise;
calculating the squeeze offset according to the relation:

$$\text{squeeze offset} = \text{off-track threshold value} + \text{overshoot value} - \text{multiplier} \times \text{sigma}.$$

36. The disk drive of claim 30, wherein:
said first data storage surface includes a plurality of zones, said plurality of zones including a first zone and a second zone, each of said plurality of zones occupying a different radial position range on said first data storage surface; and
said memory includes multiple write off-track threshold values for said first transducer, said multiple write off-track threshold values including one write off-track threshold value write condition corresponding to said first zone and another write off-track threshold value corresponding to said second zone.

37. The disk drive of claim 30, further comprising:
a controller that receives a write request from an exterior environment, said write request requesting a write operation to be performed on a target track located on said first data storage surface, and in response to said write request the controller retrieves a write off-track threshold value corresponding to said first transducer from said memory.

38. The disk drive of claim 37 wherein the controller is configured to suspend data transfer from said first transducer to said target track during performance of said write request when corresponding off-track threshold value is not satisfied.

39. The disk drive of claim 30, wherein said memory includes a random access memory.

40. The disk drive of claim 30, wherein said memory comprises a semiconductor memory.

41. The disk drive of claim 30, wherein said memory includes a portion of said at least one data storage disk.

42. A method for defining track density in a disk drive, said disk drive including at least one data storage disk, said at least one data storage disk having a data storage surface and at least a transducer for writing data to said data storage surface in concentric tracks, said method comprising the steps of:
(a) determining a position error relative to the data storage surface, corresponding to the transducer, wherein the position error is essentially a function of random noise associated with the disk drive;

(b) generating an off-track threshold value based on the position error, the off-track threshold value for use during subsequent write operations in the disk drive using the transducer, such that data is written to a track on the storage surface using the transducer if transducer position relative to the track is within the off-track threshold value to prevent damage to data written on tracks adjacent to said track;

(c) performing write operations on adjacent tracks at a track density using the transducer;

(d) performing read operations on the adjacent tracks using the transducer, and determining the number of read errors;

(e) if the number of read errors are not above the expected number of read errors, then increasing the track density and repeating steps (a)–(e), otherwise reducing the off-track threshold value, performing write operations on adjacent tracks at a track density using the transducer, performing read operations on the adjacent tracks using the transducer, and determining a new number of read errors;

(f) if the new number of read errors are not above the expected number of read errors, then determining performance of the disk drive and comparing to a desired performance level;

(g) if the new number of read errors are above the expected number of read errors, or if the performance of the disk drive is less than the desired performance level, then reducing track density and repeating steps (a)–(g), otherwise maintaining track density and storing the off-track threshold value in a memory within the disk drive for use during subsequent write operations in the disk drive using the transducer.

43. The method of claim 42, wherein in step (a) said position error is determined by:
  obtaining a position error signal (PES) from the transducer, wherein the PES signal comprises a repeatable (RRO) noise signal and a non-repeatable (NRRO), random, noise signal; and
  separating the RRO position signal from the NRRO position signal such that the NRRO position signal represents the position error.

44. The method of claim 42, wherein step (b) further includes the steps of:
  (1) selecting an off-track threshold value, and an overshoot value for maximum allowable transducer movement beyond the off-track threshold while writing on a track;
  (2) calculating a squeeze offset as a function of: (i) the off-track threshold value, (ii) the overshoot value and (iii) a predicted relative transducer off-track movement due to the random noise, based on the position error;
  (3) determining an off-track capability of the transducer at the squeeze offset off-track position; and
  (4) if the off-track capability of the transducer complies with a specified value, then maintaining the off-track threshold value as the off-track threshold value, otherwise, adjusting the off-track threshold value and repeating steps (2) through (4 using the adjusted off-track threshold value.

* * * * *